US007258029B2

(12) United States Patent
Erker

(10) Patent No.: US 7,258,029 B2
(45) Date of Patent: Aug. 21, 2007

(54) DEVICE FOR CONNECTING TOGETHER A ROLLER SCREW AND ROLLER NUT ASSEMBLY TO A STATIONARY AND MOVING MEMBER

(75) Inventor: Gerald F. Erker, Sterling Heights, MI (US)

(73) Assignee: Hirotec America, Inc., Auburn Hills, MI (US)

( * ) Notice: Subject to any disclaimer, the term of this patent is extended or adjusted under 35 U.S.C. 154(b) by 587 days.

(21) Appl. No.: 10/700,765

(22) Filed: Nov. 4, 2003

(65) Prior Publication Data

US 2004/0089084 A1 May 13, 2004

Related U.S. Application Data

(60) Provisional application No. 60/425,986, filed on Nov. 12, 2002.

(51) Int. Cl.
*F16H 1/26* (2006.01)
*F16H 3/06* (2006.01)
*F16H 27/02* (2006.01)
*F16H 29/02* (2006.01)

(52) U.S. Cl. .................................................. 74/89.36
(58) Field of Classification Search ............... 74/89.36; 464/125, 126; 403/57, 60
See application file for complete search history.

(56) References Cited

U.S. PATENT DOCUMENTS 2,806,383 A * 9/1957 Geyer ....................... 74/89.36
2,945,691 A * 7/1960 Swift et al. ................ 74/89.36
3,420,582 A * 1/1969 Shelley ....................... 403/291
3,745,840 A * 7/1973 Guralnick .................. 74/89.32
4,023,432 A * 5/1977 Killian ....................... 74/89.36
4,365,488 A * 12/1982 Mochida et al. ............ 464/132
5,301,708 A * 4/1994 Schmidt ................... 137/15.24
5,392,662 A * 2/1995 Jadrich et al. ............. 74/89.36
7,082,809 B2 * 8/2006 Balasu ........................ 72/454
2002/0069770 A1 * 6/2002 Faitel et al. ................ 100/289

* cited by examiner

*Primary Examiner*—Richard Ridley
*Assistant Examiner*—Terence Boes
(74) *Attorney, Agent, or Firm*—Fildes & Outland, P.C.

(57) ABSTRACT

A device for connecting together a vertically disposed roller screw and roller nut assembly to a stationary member and moving member includes a bearing housing attached onto a fixed end of the roller screw. The bearing house includes at least one bearing and two bearing house pivots. A first universal ring concentrically surrounds the bearing housing and includes two mating pivots mated with the two bearing house pivots and two attachment pivots mated with corresponding pivots of the stationary member. A roller nut mount rigidly attaches to the roller nut and includes two roller nut mount pivots. A second universal ring concentrically surrounds the roller nut mount. The second universal ring includes two mating pivots mated with the two roller nut mount pivots and further includes two attachment pivots mated with corresponding pivots of the moving member.

6 Claims, 5 Drawing Sheets

DEVICE FOR CONNECTING TOGETHER A ROLLER SCREW AND ROLLER NUT ASSEMBLY TO A STATIONARY AND MOVING MEMBER

CROSS REFERENCE TO RELATED APPLICATION

This application claims the benefit of U.S. Provisional Application No. 60/425,986, filed Nov. 12, 2002.

TECHNICAL FIELD

This invention relates to linear roller screw drives and more particularly to a vertically disposed arrangement for connecting together a roller screw assembly, ball screw assembly, lead screw assembly, ACME screw assembly, or other such assembly, utilizing a fixed end and a free opposite end bearing arrangement to eliminate eccentric and radial loads on the roller screw assembly from the moving member.

BACKGROUND OF THE INVENTION

It is known in the art relating to linear screw drives to fixedly connect a nut to a moving member in order to move the moving member by the actuation of a screw that drives the nut. With such an arrangement, the rigid connection between the nut and moving member can cause excessive wear on the screw and premature failure of the nut.

In closure panel hemming operations large loads are applied by linear ball screw drives drawing upper and lower dies together to edge hem preformed metal panels. In such operations, there is a need to maximize ball screw life and reduce the failure rate of ball nuts used to move the dies.

Previously, I provided a device for slip-fittably connecting together a ball nut and a moving member moved by the ball nut. The device includes a first connecting member fixedly attached to the ball nut. The first connecting member has first registration elements disposed radially opposite relative to the ball nut. A second connecting member is fixedly attached to the moving member. The second connecting member has cooperative second registration elements disposed radially opposite relative to the ball nut which cooperate with the first radially opposite registration elements.

The first and second registration elements are slip-fittably connectable together and provide indexed registration within predetermined tolerances in the axial, radial and circumferential directions relative to the ball nut.

Other manufacturers utilize gimbals on ball screw drives to effect connections between the fixed one end and free opposite end bearing arrangement to ensure that ball screw force is axial and reduce the potential for side loading the ball screw. However effective these connection solutions may be, allowance for misalignment at the attachment points of a ball screw assembly particularly where a drive mechanism is connected to the ball screw needs to be provided to eliminate side loading and premature failure of the components of the mounting arrangement or system itself.

SUMMARY OF THE INVENTION

The present invention provides a device or arrangement for connecting together a roller screw and roller nut assembly to a stationary and moving member while eliminating side loading due to off-set loads being exerted back into the roller screw from the mating structure. Accordingly, the present invention provides for cost reduction, easier assembly process, reduced maintenance and lower overall press height vis-à-vis conventional drive devices or arrangements.

The present invention also allows the roller screw and drive mechanism to float in any direction that a connected moving member takes during its vertical travel and compensates for the flexure in the structure that is designed into the structure to save on costs.

In accordance with the invention, a device for connecting a roller screw and roller nut assembly to a stationary and moving member includes a bearing housing attached onto a fixed end of a roller screw. The bearing housing itself includes at least one bearing and two bearing house pivots radially disposed 180° apart on a horizontal plane perpendicular to the longitudinal axis of the roller screw. A first universal ring concentrically surrounds the bearing housing and includes two mating pivots mated with the two bearing house pivots and two attachment pivots spacedly, radially disposed 90° from the mating pivots mated with corresponding pivots of the stationary member. A roller nut mount is rigidly attached to the roller nut and includes two roller nut mount pivots radially disposed 180° apart on a horizontal plane perpendicular to the longitudinal axis of the roller screw. A second universal ring concentrically surrounds the roller nut mount and includes two mating pivots mated with the two roller nut mount pivots and two attachment pivots spacedly, radially disposed 90° from the mating pivots mated with corresponding pivots of the moving member.

In a preferred arrangement, an axis formed by the two attachment pivots of the first universal ring is parallel to an axis formed by the two attachment pivots of the second universal ring. Further, the roller nut may be driven by rotation of the roller screw and the roller screw may be rotated by a drive mechanism. The drive mechanism may be a combination of a gear box and a motor, or other known device, and may be either loosely coupled to the roller screw or optionally fixedly attached to the bearing housing.

These and other features and advantages of the invention will be more fully understood from the following detailed description of the invention taken together with the accompanying drawings.

DETAILED DESCRIPTION OF THE INVENTION

Figure 1:
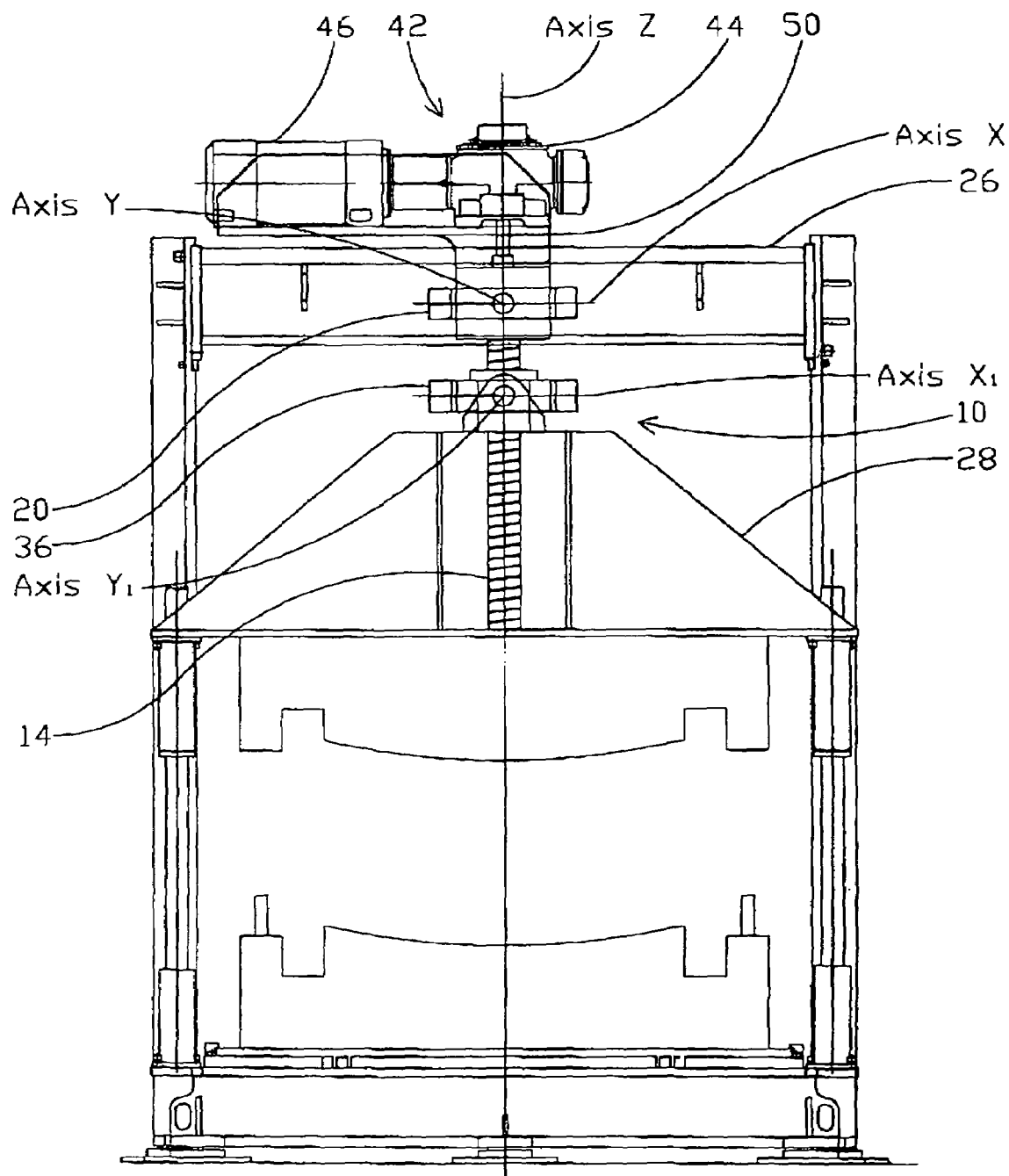
FIG. 1 is a front view of an apparatus according to the present invention on a hemming press with the hem dies in the open position.

Referring now to the drawings in detail, numeral 10 generally indicates device for connecting together a roller screw and roller nut assembly to a stationary member and moving member in accordance with the present invention. As is hereinafter more fully described, the assembly 10 eliminates side loading due to off-set loads being exerted back into the roller screw from the mating structure, provides for cost reduction, easier assembly process, reduced maintenance and lower overall press height.

Referring first to FIGS. 3 through 6, a fixed end 12 of the roller screw 14 is mounted into a bearing housing 16 that has bearings 51 to allow the roller screw to rotate in the housing. The bearing housing 16 has two bearing house pivots 18 radially disposed 180° apart that define an axis X which is disposed in a horizontal plane that is perpendicular to the longitudinal axis Z of the roller screw 14. A first universal ring 20 concentrically surrounds the bearing housing 16. The first universal ring 20 includes two mating pivots 22 on axis X and two attachment pivots 24 which are both at 90°, or perpendicular to axis X on an axis labeled axis Y. Axis Y resides on the same horizontal plane as axis X. The two attachment pivots 24 mate to corresponding stationary structure pivots 25 in a stationary structure 26. The bearing housing 16 with its first universal ring 20 is thereby connected to the stationary structure 26. The stationary structure 26 supports the roller screw 14 above a guided moving member 28 (in this case on the center of the moving member) with the roller screw 14 extending down towards the guided moving member 28.

A roller nut mount 30 is rigidly attached to a roller nut 32. The roller nut mount 30 has two roller nut mount pivots 34 radially disposed 180° apart that define an axis $X_1$ on a horizontal plane which is parallel to axis X and perpendicular to axis Z. A second universal ring 36 concentrically surrounds the roller nut mount 30. The second universal ring 36 includes two mating pivots 38 on axis $X_1$ and two attachment pivots 40 spacedly, radially disposed 90° from the mating pivots 38 defining an axis $Y_1$ which resides on the same horizontal plane as axis $X_1$. Axis $Y_1$ is arranged parallel to axis Y. The roller nut mount 30 with the second universal ring 36 is attached to the center of the guided moving member 28 by mating the attachment pivots 40 with corresponding moving member pivots 41 of the guided moving member 28.

The roller nut 32 is driven in linear directions either up or down by the rotation of the roller screw 14. The roller screw 14 is spun by a drive mechanism 42 hereinafter illustrated as a gear box 44 and an electric motor 46 although other types of drives can be applied. The drive mechanism 42 is loosely coupled to the top end 48 of the roller screw 14. The drive mechanism 42 can also be directly attached to the bearing housing 16 by a mounting bracket 50, which allows it to float with the roller screw assembly.

This device and mounting method provides the roller screw assembly unidirectional movement along axis Z between the upper attachment points on axis Y defined by the attachment pivots 24 and the lower attachment on axis $Y_1$ defined by the attachment pivots 40. This allows the guided moving member 28 to have a looser guidance tolerance. A lighter structure design can be made flexible to reduce the manufacturing cost. The moving member 28 has a limited linear, axial, and eccentric movement designed into the guidance system. The device of the present invention removes radial and eccentric loads on the roller screw assembly that occur due to misalignment. During linear travel, under compression, in tension or while applying pressure to the moving member to hem closure panels, the device allows the roller screw 14 to pivot in any direction the moving member 28 may take, thus eliminating any misalignment.

Figure 2:
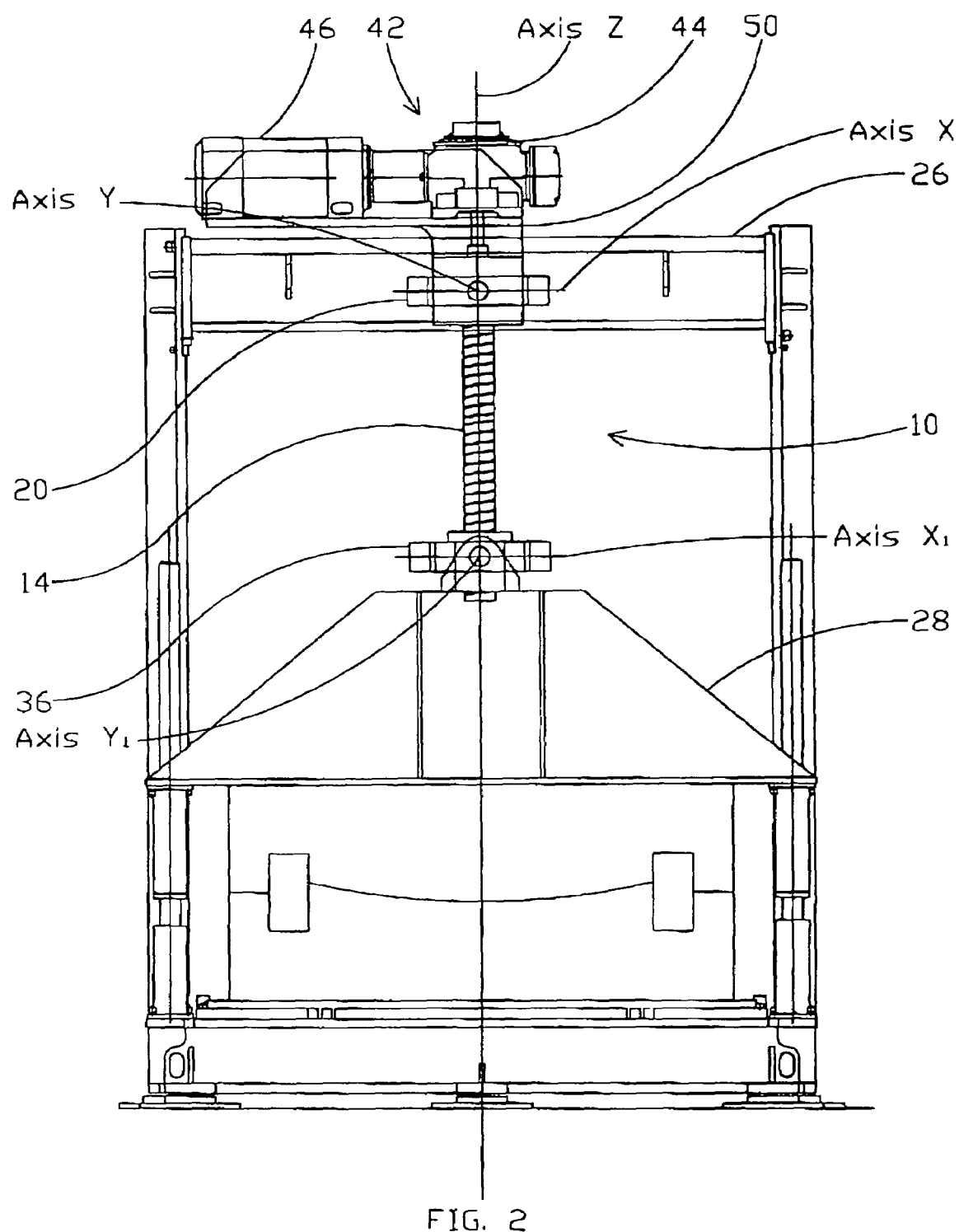
FIG. 2 is a front view of an apparatus according to the present invention on a hemming press with the hem dies in the closed position.
Figure 3:
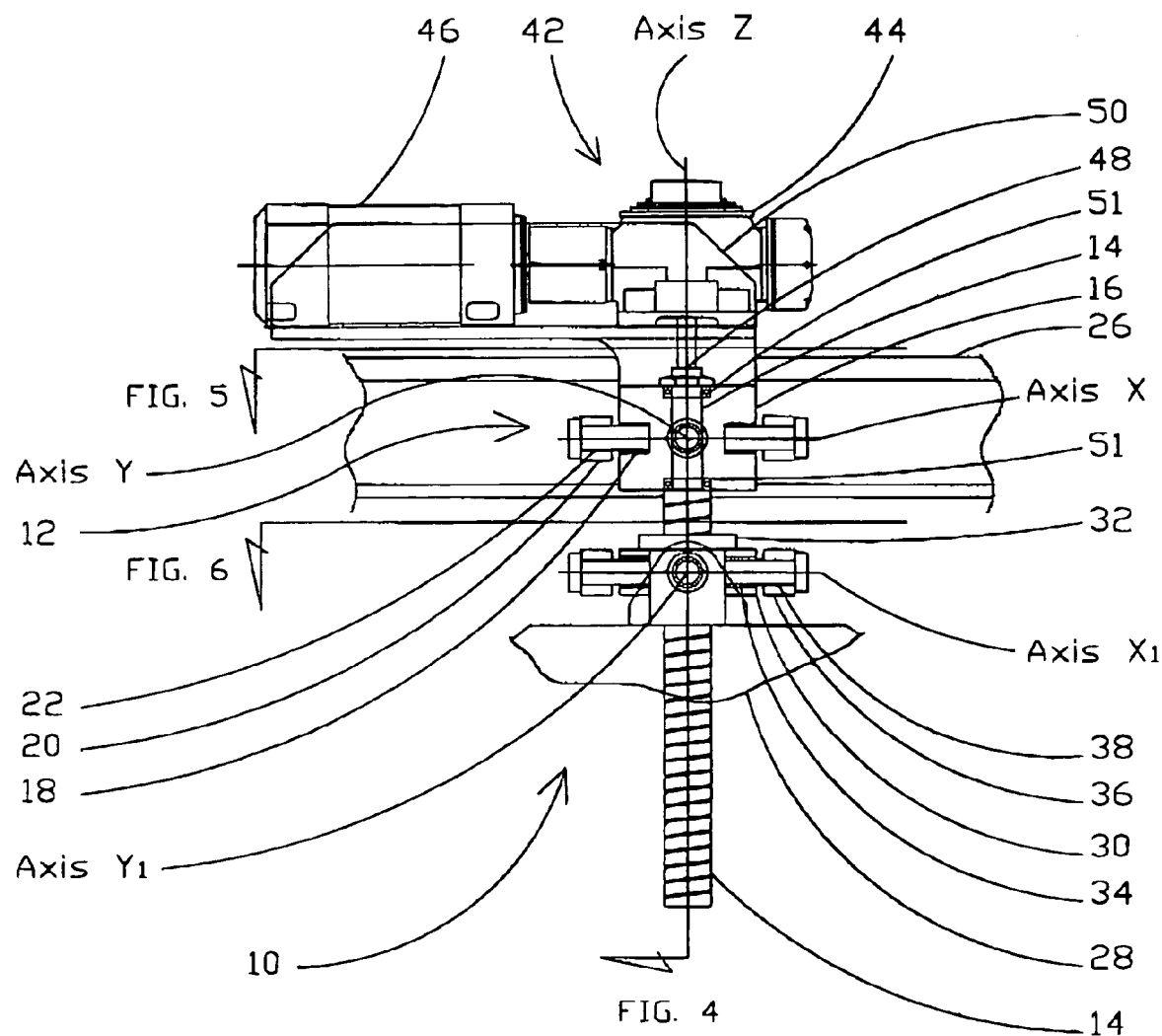
FIG. 3 is a front view of a moving member, a roller nut and a moving member nut mount, a roller screw, a roller nut and a stationary structure roller nut mount, and a drive mechanism driveably connected to the roller screw illustrated in an arrangement according to the invention that allows the drive mechanism to float with the roller screw.
Figure 4:
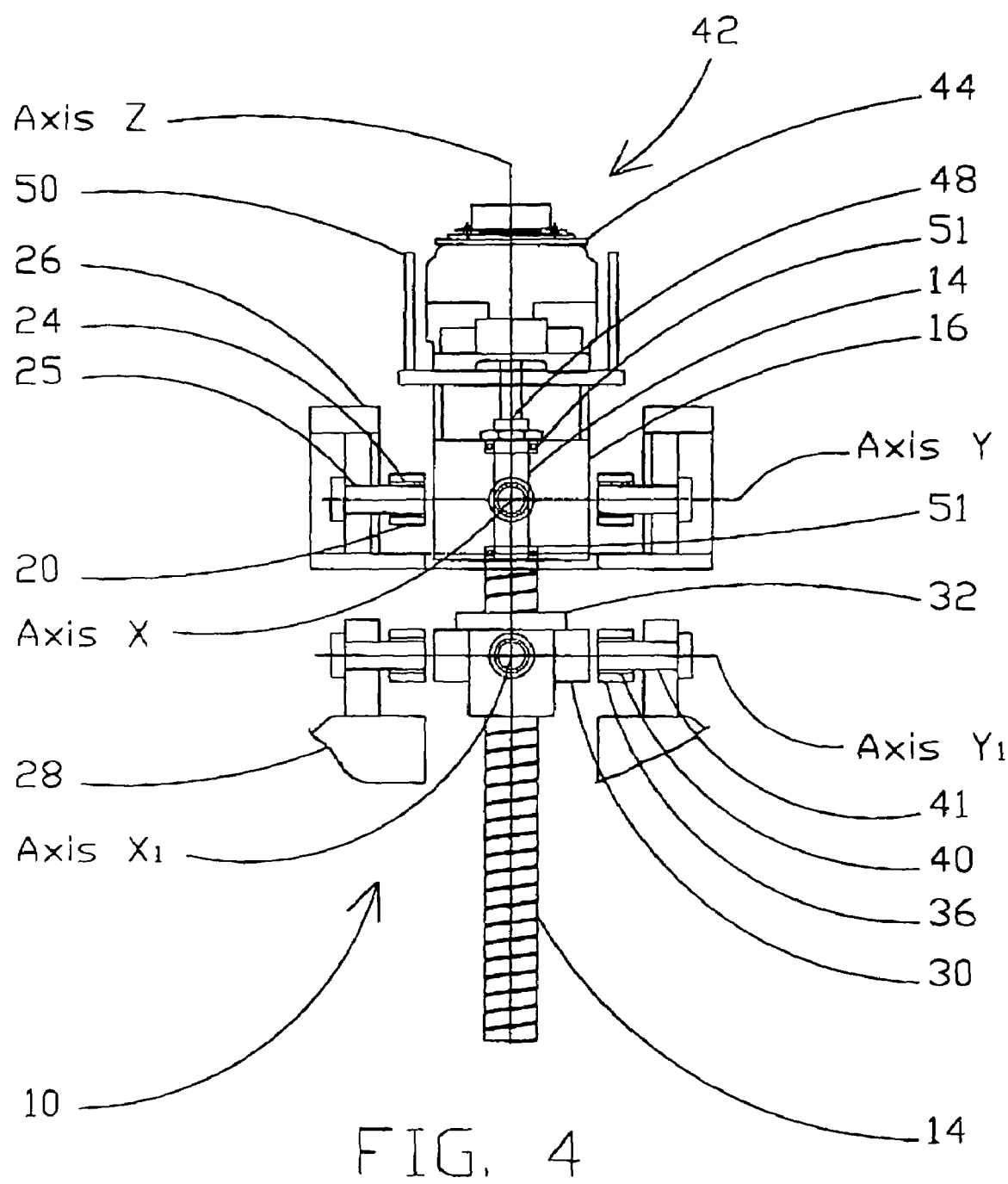
FIG. 4 is a side view of the apparatus of FIG. 3.
Figure 5:
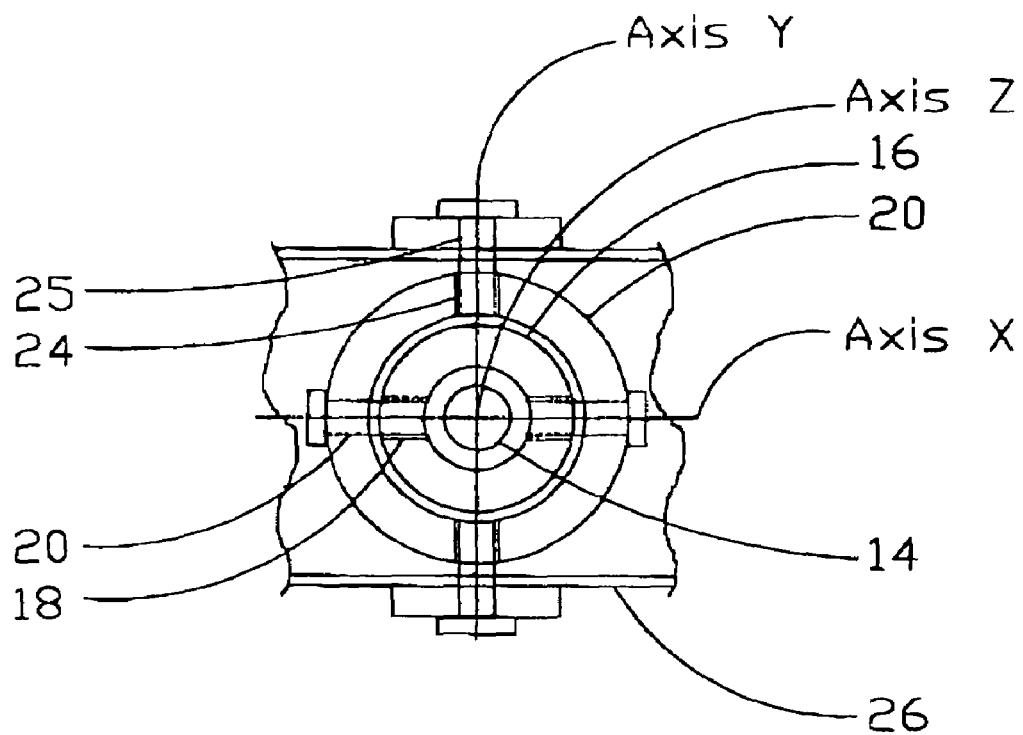
FIG. 5 is a plan view of an upper portion of the apparatus of FIG. 3.
Figure 6:
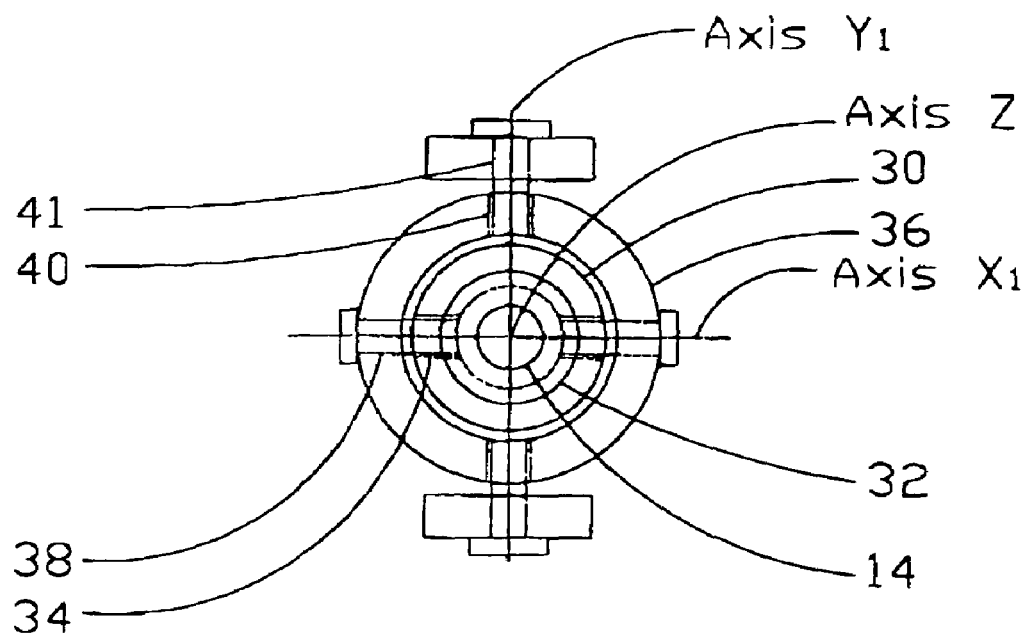
FIG. 6 is a plan view of a lower portion of the apparatus of FIG. 3.

FIGS. 1 and 2 depict a front view of an apparatus in accordance with the present invention mounted on a hemming press. The assembly 10 is supported by the support structure 26. The roller screw 14 extends down from the drive mechanism 42 towards the guided moving member 28. The drive mechanism 42 includes a motor 46 and a gear box 44 and is directly attached to the bearing house 16 by a mounting bracket 50. The assembly 10 further includes a first universal ring 20 and a second universal ring 36. FIG. 1 shows the hemming press with hem dies in an open position. Activation of the drive mechanism 42 rotates the roller screw 14 and causes the guided moving member 28 to move up and down and to thus open and close the hem die. In FIG. 2, activation of the drive mechanism 42 has moved the hem die from the open position of FIG. 1 to a closed position.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A device for connecting together a vertically disposed roller screw and roller nut assembly to a stationary member and a moving member, said device comprising:

a bearing housing attached onto a fixed end of said roller screw;

said bearing housing including at least one bearing and two bearing house pivots radially disposed 180° apart on a horizontal plane perpendicular to the roller screw longitudinal axis;

a first universal ring concentrically surrounding said bearing housing;

said first universal ring including two mating pivots mated with said two bearing house pivots and two attachment pivots spaced apart and radially disposed 90° from said mating pivots mated with corresponding pivots on the stationary member;

a roller nut mount rigidly attached to said roller nut;

said roller nut mount including two roller nut mount pivots radially disposed 180° apart on a horizontal plane perpendicular to the roller screw longitudinal axis; and a second universal ring concentrically surrounding said roller nut mount;

said second universal ring including two mating pivots mated with said two roller nut mount pivots and two attachment pivots spaced apart and radially disposed 90° from said mating pivots mated with corresponding pivots on the moving member.

2. The device of claim 1 wherein an axis Y defined by said two attachment pivots of said first universal ring is parallel to an axis $Y_1$ defined by said two attachment pivots of said second universal ring.

3. The device of claim 1 wherein said roller nut is driven by rotation of said roller screw and said roller screw is rotated by a drive mechanism.

4. The device of claim 3 wherein said drive mechanism is a combination of a gear box and a motor.

5. The device of claim 3 wherein said drive mechanism is coupled to said roller screw.

6. The device of claim 3 wherein said drive mechanism is fixedly attached to said bearing housing.

* * * * *